Jan. 24, 1956  I. D. SILLMAN  2,732,420
ELECTRICAL TRANSMISSION SYSTEM
Filed April 30, 1954  4 Sheets-Sheet 1
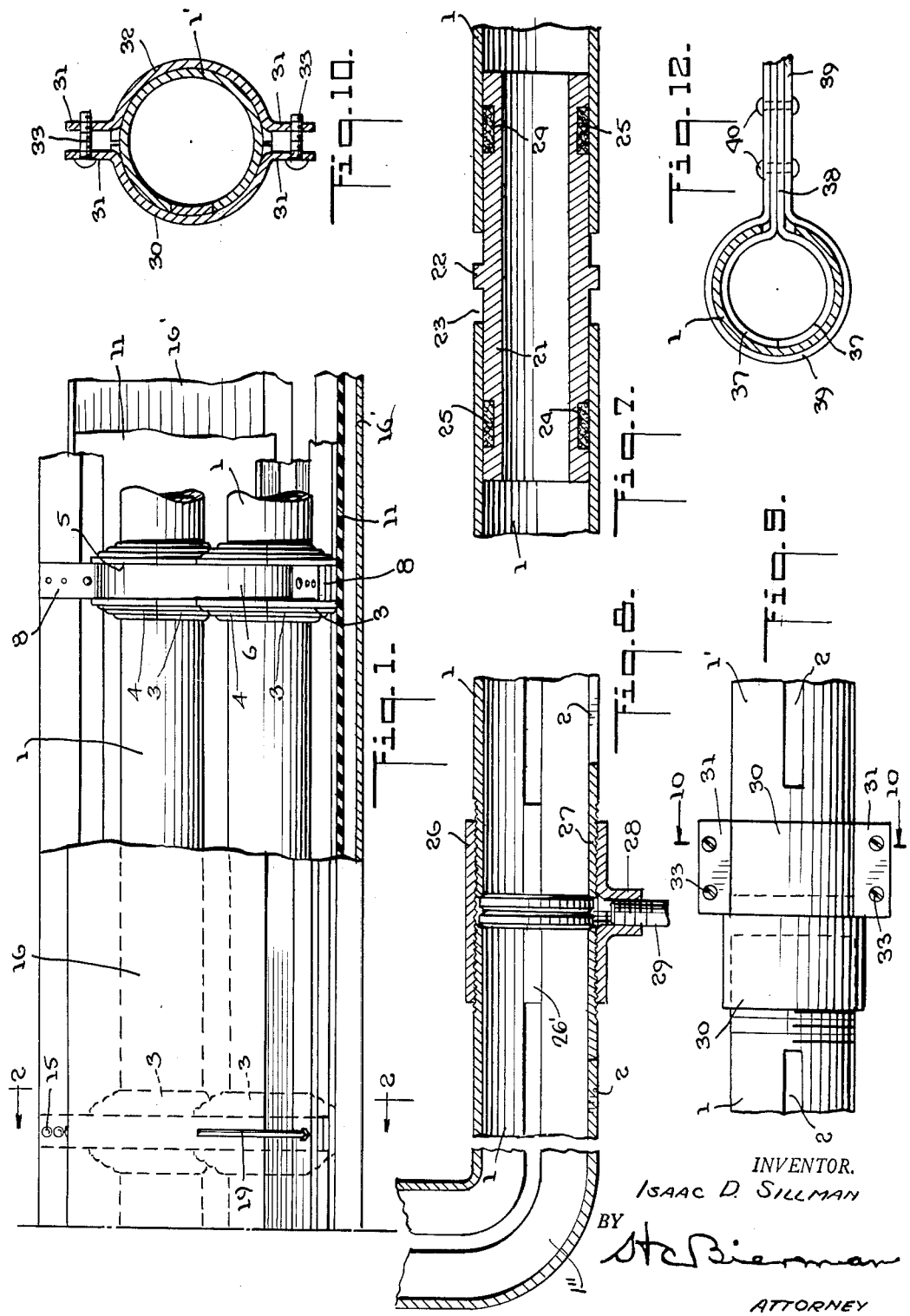
INVENTOR.
ISAAC D. SILLMAN
BY
ATTORNEY Jan. 24, 1956     I. D. SILLMAN     2,732,420
ELECTRICAL TRANSMISSION SYSTEM
Filed April 30, 1954     4 Sheets-Sheet 2
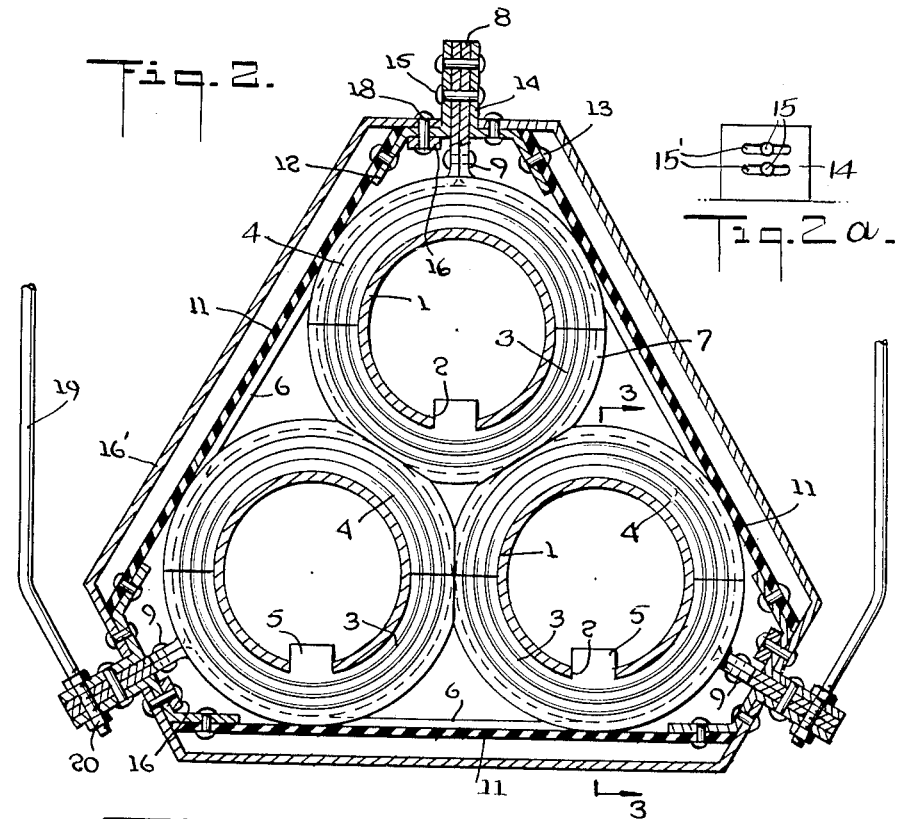
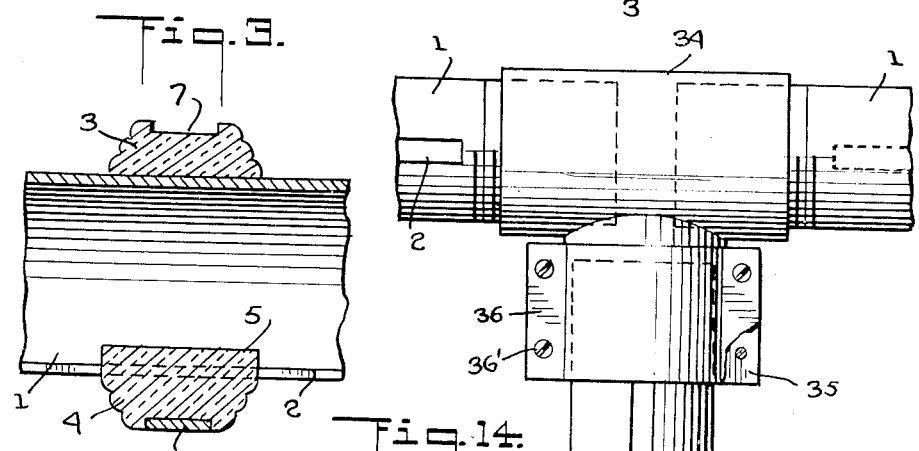
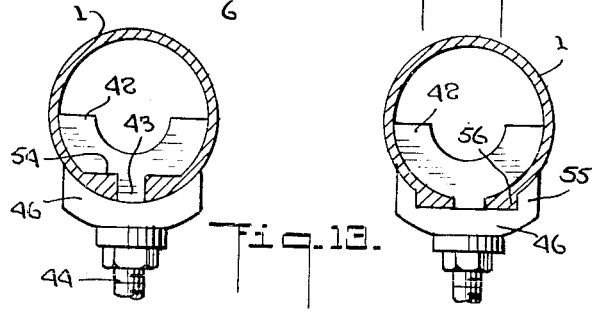
INVENTOR.
ISAAC D. SILLMAN
BY
ATTORNEY

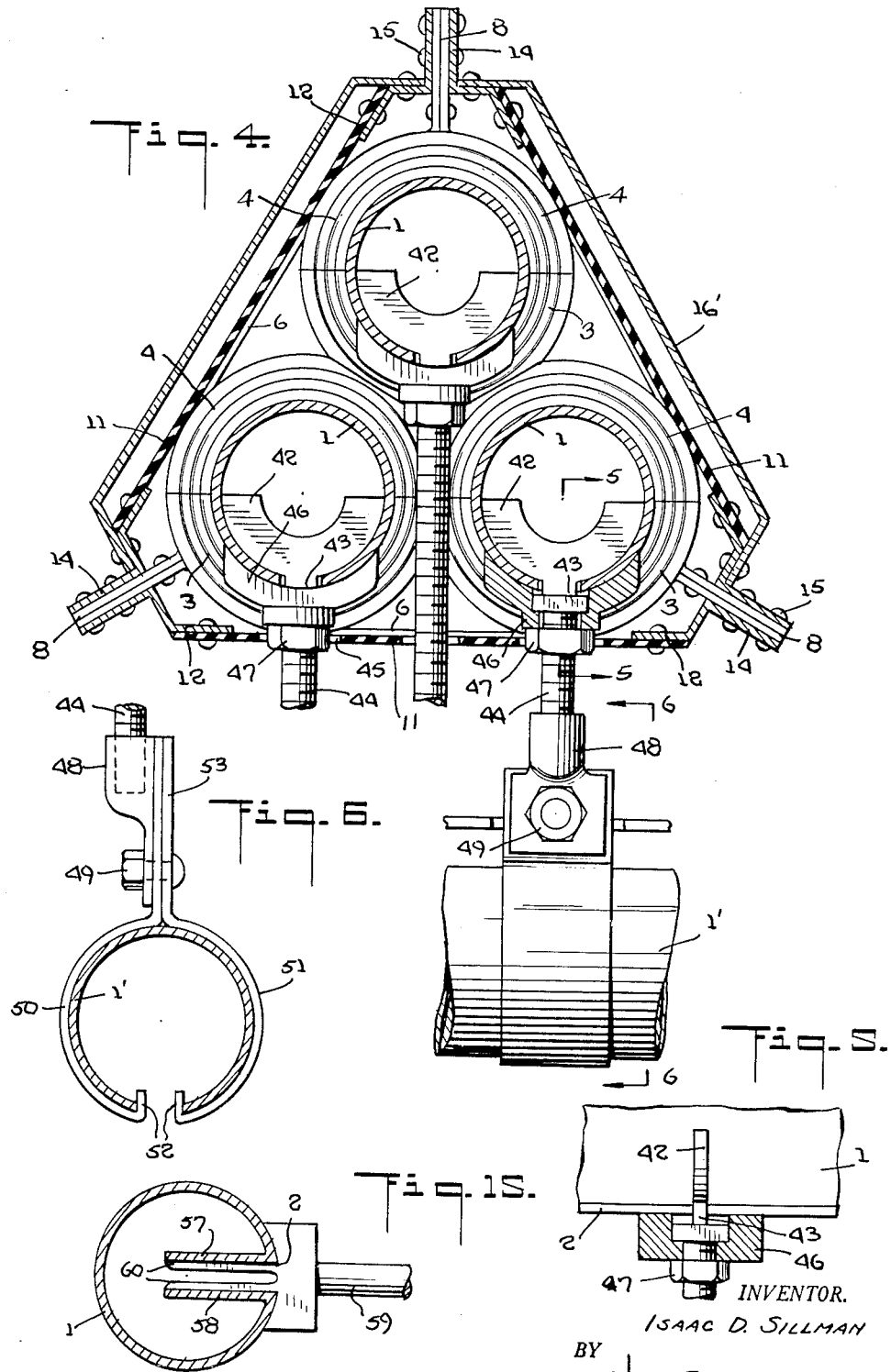

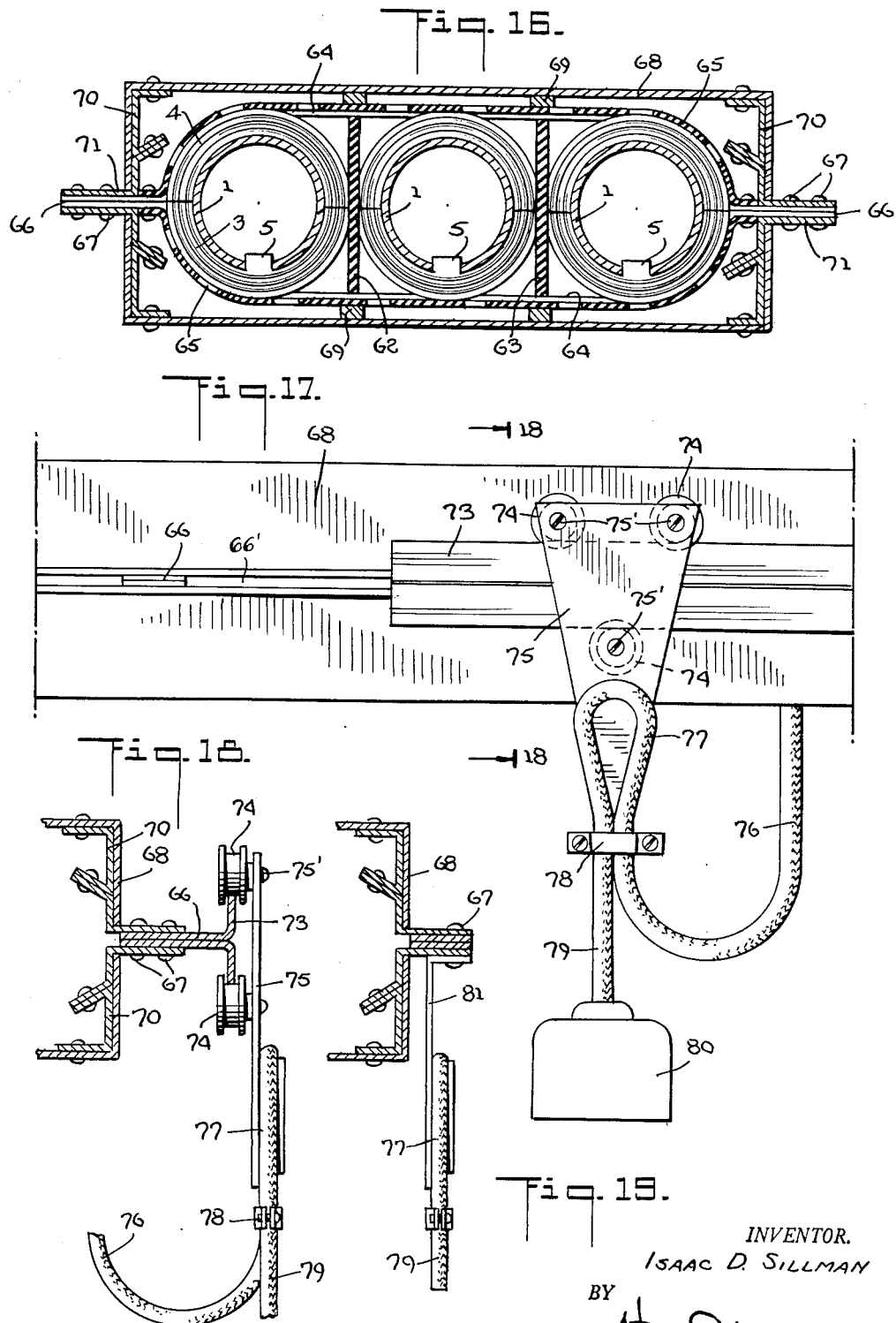

United States Patent Office 2,732,420
Patented Jan. 24, 1956

2,732,420
ELECTRICAL TRANSMISSION SYSTEM
Isaac D. Sillman, New York, N. Y.

Application April 30, 1954, Serial No. 426,821

28 Claims. (Cl. 174—68)

The present invention is directed to electrical transmission systems, more particularly to conduits and branch conduits such as are commonly installed in multiple floor office and industrial buildings.

It is highly desirable in such transmission systems to reduce the weight thereof in order to conserve metals and thus render the system more economical. It is also desirable to reduce the area occupied by such a system so as to enable one to install it in limited or irregular spaces or areas in the building.

Accordingly it is among the objects of the present invention to provide an electrical transmission system which is substantially lighter in weight than those previously used and which has a higher current carrying capacity than prior systems of equivalent size.

It is further among the objects of the present invention to provide a system which may be easily assembled by the ordinary workman and which may be readily assembled and erected on the premises by the ordinary electrician.

It is still further among the objects of the present invention to avoid the necessity of the use of steel casings and to provide a structure which has natural ventilation to prevent the development of undue temperature in the system.

In practicing the present invention, there is provided a plurality of conducting tubes which are arranged in parallel and usually there are three such tubes or multiples thereof for multiple phase current. Each of the tubes is slotted along the major portion of its length for the purpose of providing ventilation in the tubes and for contacts for takeoffs for branch circuits both inside the tube and outside thereof. The tubes are usually circular but may be of various shapes and the ends may be threaded so that they may be joined by nipples to the ends of adjacent tubes. Usually the principal set of tubes is vertical or horizontal and takeoffs may be clamped to the tubes in the slots thereof. This is accomplished by inserting a disk in the slot, turning it ninety degrees, placing a clamp shoe on the outside, and tightening by a nut; it may also be accomplished by inserting spoon-shaped contact members in the tube and drawing it tightly against the tube by an outside band which is clamped to a tight takeoff.

Each of the tubes is covered with porcelain or similar insulation at spaced points, and bands of metal placed around the insulation clamp the tubes together as a unit. Then, around the assembly, are insulating shields, which may be fiber sheets and held in position by suitable means. In addition thereto, horizontal and vertical supports are provided to maintain the assembly in proper position within the structure.

Various other elements are provided, such as expansion joints between certain of the end-to-end tubes with means to maintain good electrical contact through such joints. Also inserts may be introduced into certain portions of the slots in order to stiffen and prevent accidental collapse of the tubes at points where relatively large stresses may occur.

In the accompanying drawings constituting a part hereof and in which like reference characters indicate like parts, Fig. 1 is a side elevational view of a portion of the present system, some parts being broken away for clearness;

Fig. 2 is a transverse cross-sectional view taken along the line 2—2 of Fig. 1;

Fig. 2a is a fragmentary side elevational view of the top of Fig. 1;

Fig. 3 is an enlarged fragmentary cross-sectional view of a portion of one tube showing an insulator in place;

Fig. 4 is a view similar to Fig. 3 but taken at a point where takeoffs are applied;

Fig. 5 is a cross-sectional view taken along line 5—5 of Fig. 4;

Fig. 6 is a cross-sectional view taken along line 6—6 of Fig. 4;

Fig. 7 is a longitudinal cross-sectional view of an expansion joint for a pair of tubes;

Fig. 8 is a longitudinal cross-sectional view of a connection between a pair of tubes;

Fig. 9 is an elevational view of a connector of modified form;

Fig. 10 is a cross-sectional view taken along line 10—10 of Fig. 9;

Fig. 11 is a side elevational view of a combined connector and takeoff arrangement;

Fig. 12 is a transverse cross-sectional view of a form of takeoff from said tube;

Fig. 13 is a transverse cross-sectional view of a takeoff from an intermediate part of a tube where the tube is modified at the edges of the slots;

Fig. 14 is a view similar to Fig. 13, showing a modified form of tube and takeoff;

Fig. 15 is a view similar to Fig. 13 and showing a still further modified form of tube and takeoff at said tube;

Fig. 16 is a transverse cross-sectional view of a different arrangement of tubes than that shown in Figs. 2 and 4;

Fig. 17 is an end and elevational view of the modification shown in Fig. 16;

Fig. 18 is a cross-sectional view taken along lines 18—18 of Fig. 17, and

Fig. 19 is a modified form of takeoff as shown in Fig. 18.

Referring to Figs. 1 to 3, there are provided three tubes 1 of copper, placed in delta formation and being slotted at 2 along the major portion of the lengths thereof. The tubes are insulated from each other by split bands 3 and 4 of insulating material such as porcelain, glass or the like. A tongue 5 on one of bands 3 or 4 extends into slot 2 and stiffens the tube. A metal strap 6 fitted into grooves 7 of each of the three insulators binds the tubes together to form a solid unit.

The ends 8 of adjacent straps 6 are riveted or bolted together at 9 and extend between Z-shaped members 12—14. Legs 14 hold the ends 8 of adjacent straps 6 and legs 12 to sheets 11 by rivets 13. One leg 14 of the Z contacts extensions 8 and they are secured together by bolts or rivets 15; the holes 15' for the same being slotted to allow expansion of tubes 1. A neutral bar 16 is riveted to the assembly by rivets 18. Rods 19 are bolted as shown at 20 and provide supports for the structure. The outer covering 16' is of sheet or expanded metal to protect the assembly from external damage.

Referring to Fig. 7, there is shown a form of connector between adjacent tubes 1 which are placed end to end throughout the structure. The connector 21 consists of a sleeve fitted internally in the ends of adjacent tubes.

It has a central flange 22 on the outer face thereof which projects into space 23 between said tubes. Grooves 24 are formed near the ends of sleeve 21 and bands or fine stranded copper wire 25 are laid in said grooves. The strands are frictionally engaged with the inside of the tubes, making a tight connection which is electrically conducting, but they permit movement of the tubes due to expansion by heat generated by current flowing through them.

Another form of connector is shown in Fig. 8 wherein a connector 26, which is internally threaded, is threaded into the ends 27 of adjacent tubes 1. A boss 28 extends from connector 26 and has threaded therein a lug 29 acting as a takeoff.

A still further form of connector is shown in Figs. 9 and 10 which consists of an external sleeve 30, one end of which is threaded onto tube 1. The other end of sleeve 30 is in two parts; one part integral therewith has ends 31. The other part 32 also has ends 31 and bolts 33 clamp the adjacent ends together to tightly clamp the sleeve to tube 1".

With reference to Fig. 11 there is provided a T-shaped tubular connector 34 into which the ends of adjacent tubes 1 are inserted and held by cooperating threads. End 35 of sleeve 34 is integral therewith and has laterally-extending flanges as shown in Fig. 12. A similar piece 36 separate from the sleeve co-acts with ends 35 which are bolted together to grip the tubes by bolts 36.

In Fig. 12 is shown a modified form of connector consisting of a pair of spoon-like members 37 inserted in tube 1 and having ends 38 passing through the slot. A band 39 surrounding tube 1 has its ends brought together over ends 38 and all said ends are held by rivets or bolts 40.

With reference to Figs. 4, 5 and 6, there is shown the structure of a takeoff arrangement whereby a branched conductor is secured to the main tube. One element 42 in the form of a disk is inserted through slot 2 and turned ninety degrees so as to bear against the inner face of tube 1. An extending end 43 passes through the slot and is threaded at 44, passing opening 45 in metal support 16. An external shoe or clamp 46 is inserted over extension 43 and a nut 47 clamps the elements together as a unit. Lug 48 is threaded onto end 44 and is bolted at 49 to a split ring 50 and 51 having inturned flanges 52 entering slot 2 of tube 1'. The ends 53 are clamped by bolt 49. Tube 1' constitutes a branch circuit.

Other forms of takeoffs are provided for as shown in Figs. 13 to 15 wherein the tube circumference has been modified. In Fig. 13 the tube 1 is provided with an internal reinforcement 54 with disk 42 suitably formed so as to fit against the reinforcement. In Fig. 14 shoe 46 is in the form of a spider having legs 55 contacting with external reinforcement 56 on the tube. These reinforcements not only strengthen the tube but provide additional conductivity.

In Fig. 15 tube 1 is provided with internal flanges 57 and 58 along the edges of slot 2. Connector 59 has a pair of spring legs 60 so that it may be pushed into slot 2 and be held against flanges 57 and 58 by friction.

Referring to Fig. 16, tubes 1 are arranged in alignment, which in certain circumstances might be desirable. They are separated by insulating strips 62 and 63 and bands 64 hold the three tubes together as a rigid unit. Insulating sheet material 65 surrounds the assembly and the ends 66 thereof are secured together by rivets 67. A sheet or expanded metal casing 68 surrounds the assembled structure and blocks 69 are provided so that no relative movement is possible. Brackets 70 are joined by rivets to Z-shaped pieces 71 similar to pieces 12—14 the free ends of which are held in fixed relation to ends 66 by rivets or bolts 67 passing through slots in said members.

In Figs. 17 and 18 is shown a modified form of takeoff in which there is a flexibility in the connections. Ends 66 have extensions 73 at right angles thereto held in rollers 74. A connecting or supporting member 75 is secured to rollers 74 by rivets 75'. A cable 76 connected to the bus has a loop 77 which is held at its base by clamp or grip 78. Lead 79 therefrom extends to equipment 80.

A slightly modified form of flexible takeoff is shown in Fig. 19. A connecting or supporting member 81 is held by rivet 67 and loop 77 is held thereto in a manner similar to that shown in Fig. 18.

Longitudinal slot 2 provides additional advantages as it permits the insertion of an insulated neutral conductor within the area of the inside of the tube 1. Should another voltage system be required to add to the utility of the present transmission system, a transformer apparatus could be installed and tapped onto the tubes to serve as the primary, while the secondaries of the transformer could be returned to the interior of the tubes through the slots and current transmitted in both directions.

The insulators may be serrated in order to increase the creepage between phases. The distance between each set of insulators and their bands is determined by the short circuit current value required. The longitudinal members 12—14, either horizontal or vertical, serve several purposes, namely, to provide a neutral conductor 16 or act as a support for a special neutral conductor adjacent to each phase, thus minimizing distribution losses. They (members 12—14) serve as a continuous means for joining and holding in place all of the insulators 3 and 4 and their bands 8. They further provide additional means for holding the non-metallic covering 11 for the entire assembly against accidental contact from the exterior.

These longitudinal members 12—14 provide means for holding the covering 16' of the assembly against mechanical damage and they provide additional means for the entrance and circulation of air around the interior of the assembly and on the outside of the tubes, which may have various shapes (see Figs. 13, 14 and 15) but preferably they are circular in cross-section.

Filler pieces 26', Fig. 8 may be placed in or around the tubes to stiffen them at such points where they may be weakened by threading. Such filler pieces may also be used at the junction of tubes in axial alignment, and may be used to reinforce the tubes at points of maximum stress. The slots of contiguous lengths of tubes may be arranged at various angles to each other, such as at 180° (Fig. 11) to increase the effects of convection currents in the system. The supporting members may have slots 15' for the rivets or bolts, thus permitting relative movement of the conductors, although the entire structure may be fixed at spaced points. The tubes and associated elements need not be straight in all cases, as they may be bent out of line to obtain offsets and bends 1" (Fig. 8) to conform to the building space available for carrying the system.

These and other changes may be made in the details of operation of the invention within the spirit thereof, and the invention is not to be limited except by the character of the claims appended hereto.

I claim:

1. An electrical transmission system comprising a plurality of conducting tubes parallel and adjacent to each other, each of said tubes having a slot along a substantial part of its length, insulation surrounding each tube at intervals, electrically conducting takeoff members in contact with the inside of said tubes, electrically conducting clamping means on the outside of said tubes and attached to said takeoff members through said slots, means for supporting said tubes in contact with said insulation and binding said insulation together, a transverse plane passing through said supporting means also passing through said insulation of said tubes at said intervals.

2. A system according to claim 1 in which said takeoffs include shoes and said clamping means inclue means for firmly holding said shoes and clamping means together.

3. A system according to claim 2 in which one of said shoe means and clamping means has an extension fitting the sides of said slot to prevent distortion of said tube.

4. A system according to claim 1 in which said insulation is a split band fitted around each tube with means for binding together the bands at said intervals.

5. A system according to claim 4 in which said insulation has a groove, said binding means being a strap fitting into said grooves.

6. A system according to claim 1 in which said insulation has a tongue fitting into said slot to stiffen said tube.

7. A system according to claim 1 in which said supporting means is longitudinally spaced from said takeoff members.

8. A system according to claim 1 in which there is additional insulation in sheet form surrounding said first mentioned insulation and means for securing said sheet insulation to the insulation of said tubes.

9. A system according to claim 5 in which an extension of said strap is attached to an insulating sheet surrounding the insulation around said tubes.

10. A system according to claim 1 in which there are three tubes in delta arrangement.

11. A system according to claim 1 in which there are three tubes in side-by-side arrangement.

12. A system according to claim 1 in which there are additional tubes placed end-to-end with said conducting tubes and conducting connectors joining said additional tubes to said first mentioned tubes.

13. A system according to claim 12 in which said connectors are threaded onto said tubes.

14. A system according to claim 12 in which said connectors are split sleeves clamped onto said tubes.

15. A system according to claim 12 in which said connectors are frictionally held to allow expansion and contraction of said tubes.

16. A system according to claim 15 in which said connector has at least one groove in its outer face and conducting strands in said groove to provide electrical contact between said tube and connector.

17. A system according to claim 12 in which said connector is T-shaped with a takeoff tube attached to the leg of said T.

18. A system according to claim 1 in which said takeoff member has an in-turned flange contacting the side of said slot.

19. A system according to claim 1 in which each tube has in-turned flanges substantially parallel to each other, said takeoff fitting between said flanges.

20. A system according to claim 19 in which the end of said takeoff is split and resilient.

21. A system according to claim 1 in which said supporting means has an extending portion, at least one roller mounted on said portion, means on said roller holding a flexible cable, whereby said cable may be shifted along said tube.

22. A system according to claim 21 in which said cable is electrically connected to said tube.

23. A system according to claim 21 in which there is a loop in said cable and means for clamping the base of said loop to said holding means.

24. A system according to claim 11 in which insulating strips are located between adjacent tubes.

25. A system according to claim 12 in which the slots of the end-to-end tubes are out of longitudinal alinement.

26. A system according to claim 1 in which said tubes are bent out of line to form offsets.

27. A system according to claim 1 in which said supporting means has openings, said takeoff members passing through said openings.

28. A system according to claim 1 in which at least one edge of said slot has a greater cross-sectional area than said tube.

References Cited in the file of this patent

UNITED STATES PATENTS

| | | |
|---|---|---|
| 2,033,743 | Shoemaker | Mar. 10, 1936 |
| 2,053,561 | Jennison | Sept. 8, 1936 |
| 2,057,266 | Rippere | Oct. 13, 1936 |
| 2,167,378 | Shoemaker et al. | July 25, 1939 |
| 2,306,353 | Cole et al. | Dec. 22, 1942 |
| 2,318,859 | Huguelet | May 11, 1943 |
| 2,469,445 | Scott, Jr. | May 10, 1949 |